United States Patent
Chen et al.

(10) Patent No.: US 9,680,644 B2
(45) Date of Patent: Jun. 13, 2017

(54) USER AUTHENTICATION SYSTEM AND METHODS

(71) Applicant: TECHNION RESEARCH & DEVELOPMENT FOUNDATION LTD., Haifa (IL)

(72) Inventors: Rafael Chen, Rosh Ha'Ayin (IL); Shay Kutten, Haifa (IL); Eli Biham, Haifa (IL)

(73) Assignee: TECHNION RESEARCH AND DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 14/340,586

(22) Filed: Jul. 25, 2014

(65) Prior Publication Data

US 2015/0033310 A1 Jan. 29, 2015

Related U.S. Application Data

(60) Provisional application No. 61/858,331, filed on Jul. 25, 2013.

(51) Int. Cl.
*H04L 9/32* (2006.01)
*H04L 9/08* (2006.01)
*H04L 29/06* (2006.01)

(52) U.S. Cl.
CPC .......... *H04L 9/0866* (2013.01); *H04L 9/3231* (2013.01); *H04L 63/08* (2013.01)

(58) Field of Classification Search
CPC ...... H04L 63/08; H04L 9/3231; H04L 9/0866
(Continued)

(56) References Cited

U.S. PATENT DOCUMENTS

| 8,892,461 | B2 | 11/2014 | Lau et al. |
| 2002/0091937 | A1* | 7/2002 | Ortiz .................. H04L 63/0861 726/5 |

(Continued)

FOREIGN PATENT DOCUMENTS

WO WO99/09512 A1 2/1999

OTHER PUBLICATIONS

Deravi, Farzin and Guness, S.P. (2011) Gaze Trajectory as a Biometric Modality. In: Biosignals 2011, Jan. 2011, Rome, Italy.*

(Continued)

*Primary Examiner* — Theodore C. Parsons
*Assistant Examiner* — Thomas Ho
(74) *Attorney, Agent, or Firm* — Daniel J. Swirsky; AlphaPatent Associates Ltd.

(57) ABSTRACT

Authenticating a user by presenting an authentication instruction to an individual via any computing device output interfaces, the authentication instruction selected from an identity authentication profile, receiving a response to the authentication instruction via any input methods supported by the computing device, the response including content provided through the performance of an action, determining a current action measurement for characteristics associated with the action, and a current content measurement for characteristics associated with the content, where the characteristics are associated with the authentication instruction, determining that each of the measurements matches a corresponding benchmark associated with the authentication instruction to within a predefined tolerance, where the benchmarks are selected from the identity authentication profile and performing the presenting, receiving, and determining steps for each of a predefined number of authentication instructions selected from the identity authentication profile, thereby authenticating the individual.

15 Claims, 7 Drawing Sheets

(58) Field of Classification Search
USPC .......................................................... 726/7
See application file for complete search history.

(56) References Cited

U.S. PATENT DOCUMENTS

| | | | | |
|---|---|---|---|---|
| 2003/0056100 | A1* | 3/2003 | Beatson | G07C 9/00063 713/176 |
| 2006/0210122 | A1* | 9/2006 | Cleveland | A61B 3/107 382/117 |
| 2006/0259304 | A1* | 11/2006 | Barzilay | G10L 17/00 704/273 |
| 2007/0245148 | A1* | 10/2007 | Buer | H04L 9/3271 713/182 |
| 2007/0271466 | A1 | 11/2007 | Mak et al. | |
| 2012/0054057 | A1 | 3/2012 | O'Connell et al. | |
| 2012/0204259 | A1* | 8/2012 | Nakamura | G06F 21/32 726/19 |
| 2015/0040193 | A1 | 2/2015 | Clemons | |

OTHER PUBLICATIONS

Margit Antal et Al., Identity Information Revealed From Mobile Touch Gestures, Studia Univ. Babes-Bolyai, Informatica, 10th Joint Conference on Mathematics and Computer Science, vol. LIX Special Issue 1, May 21-25, 2014, Cluj-Napoca.

Beatson, Rod, "The Use of Behavioral Biometrics in E-Authentication", Sep. 20, 2006, http://www.biometrics.org/bc2006/presentations/Wed_Sep_20/Session_III/Biometrics_and_EAuth/20_Beatson_e-auth.pdf, Biometric Consortium, Washington, D.C., USA.

Frank, Mario, et al., "Touchalytics: On the Applicability of Touchscreen Input as a Behavioral Biometric for Continuous Authentication", IEEE Transactions on Information Forensics and Security, Jul. 6, 2012, vol. 8, No. 1, pp. 136-148, IEEE, New York, NY, USA.

Hirschauge, Orr, "Startup of the Week Bypassing Online Passwords With Biometrics", Apr. 4, 2013, Haaretz, http://www.haaretz.com/israel-news/business/startup-of-the-week-bypassing-online-passwords-with-biometrics.premium-1.513445, Tel Aviv, IL.

Moskovitch, Robert, et al., "Identity Theft, Computers and Behavioral Biomentrics", IEEE International Conference on Intelligence and Security Informatics, Jun. 8, 2009, pp. 155-160, IEEE, New York, NY, USA.

Saevanee, H., et al., "User Authentication Using Combination of Behavioral Biometrics over the Touchpad Acting Like Touch Screen of Mobile Device", IEEE International Conference on Computer and Electrical Engineering, Dec. 20, 2008, pp. 83-86, IEEE, New York, NY, USA.

Yampolskiy, Roman V. et al., "Behavioural Biometrics: A Survey and Classification", International Journal of Biometrics, Jun. 1, 2008, pp. 81-113, vol. 1, No. 1, Inderscience Publishers, Olney, Bucks, UK.

Meng, Yuxin, "Touch Gestures Based Biometric Authentication Scheme for Touchscreen Mobile Phones", International Conference on Information Security and Cryptology, Nov. 28, 2012, vol. 7763, pp. 331-350, Springer-Verlag Berlin, Heidelberg, DE.

"Where DARPA is Going, You Don't Need Passwords", Feb. 12, 2013, Defense Advanced Research Projects Agency, http://www.darpa.mil/NewsEvents/Releases/2013/02/12.aspx, Washington, D.C., USA.

* cited by examiner

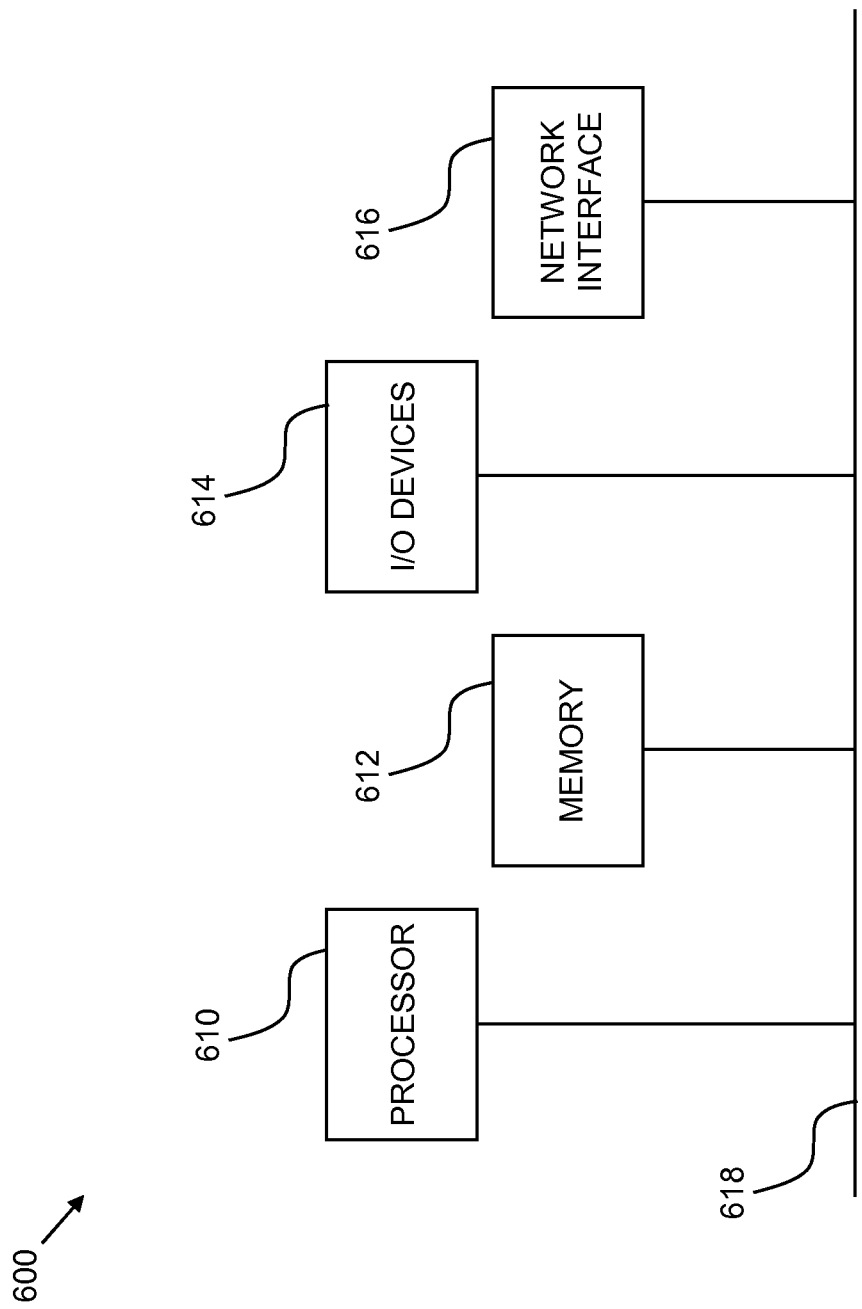

USER AUTHENTICATION SYSTEM AND METHODS

CROSS-REFERENCE TO RELATED APPLICATION

This application claims the benefit of U.S. Provisional Patent Application No. 61/858,331, filed Jul. 25, 2013, the disclosure of which is incorporated herein by reference in its entirety.

BACKGROUND

Authentication systems commonly require that an individual who requests access to computer systems or facilities provide passwords or other personal information known to the individual, access cards or keys possessed by the individual, or biometric features that uniquely characterize the individual, such as fingerprints and hand geometries, in order to authenticate the requestor. Unfortunately, passwords, personal information, and access cards or keys are often illicitly obtained or copied by impostors. While biometric characteristics are harder to illicitly obtain, copy, or impersonate, it is not impossible to do so, and the options for substituting compromised biometric characteristics with other biometric characteristics are limited.

SUMMARY

In one aspect of the invention a method is provided for configuring an identity authentication profile, the method including a) presenting an instruction to an individual via any of multiple output interfaces of a computing device, b) receiving a response to the instruction via any of multiple input methods supported by the computing device, where the response includes content provided through the performance of an action, c) determining a current action measurement for each of multiple characteristics associated with the action, d) determining a current content measurement for each of multiple characteristics associated with the content, e) identifying at least one of the current action measurements that meets a dissimilarity condition with respect to corresponding past measurements of the same characteristic for previously-received responses to the instruction, and at least one of the current content measurements that meets a dissimilarity condition with respect to corresponding past measurements of the same characteristic for previously-received responses to the instruction, where the previously-received responses were provided by multiple other individuals, f) performing steps a)-e) multiple times, thereby receiving multiple responses, g) determining that the multiple responses are mutually consistent in accordance with a consistency condition, and h) including benchmarks of the identified measurements in an identity authentication profile in association with the instruction, where the identity authentication profile is associated with the individual.

In another aspect of the invention a system is provided for configuring an identity authentication profile, the system including an instruction pool, and a configuration manager configured to a) present an instruction from the instruction pool to an individual via any of multiple output interfaces of a computing device, b) receive a response to the instruction via any of multiple input systems supported by the computing device, where the response includes content provided through the performance of an action, c) determine a current action measurement for each of multiple characteristics associated with the action, d) determine a current content measurement for each of multiple characteristics associated with the content, e) identify at least one of the current action measurements that meets a dissimilarity condition with respect to corresponding past measurements of the same characteristic for previously-received responses to the instruction, and at least one of the current content measurements that meets a dissimilarity condition with respect to corresponding past measurements of the same characteristic for previously-received responses to the instruction, where the previously-received responses were provided by multiple other individuals, f) perform steps a)-e) multiple times, thereby receiving multiple responses, g) determine that the multiple responses are mutually consistent in accordance with a consistency condition, and h) include benchmarks of the identified measurements in an identity authentication profile in association with the instruction, where the identity authentication profile is associated with the individual.

In another aspect of the invention a user authentication method is provided including a) presenting an authentication instruction to an individual via any of multiple output interfaces of a computing device, where the authentication instruction is selected from an identity authentication profile that is accessible to the computing device, b) receiving a response to the authentication instruction via any of multiple input methods supported by the computing device, where the response includes content provided through the performance of an action, c) determining a current action measurement for each of multiple characteristics associated with the action, and a current content measurement for each of multiple characteristics associated with the content, where the characteristics are associated with the authentication instruction, d) determining that each of the measurements matches a corresponding benchmark associated with the authentication instruction to within a predefined tolerance, where the benchmarks are selected from the identity authentication profile, and e) performing steps a)-d) for each of a predefined number of authentication instructions selected from the identity authentication profile, thereby authenticating the individual.

In another aspect of the invention a user authentication system is provided including an identity authentication profile, and an authenticator configured to a) present an authentication instruction to an individual via any of multiple output interfaces of a computing device, where the authentication instruction is selected from the identity authentication profile, b) receive a response to the authentication instruction via any of multiple input methods supported by the computing device, where the response includes content provided through the performance of an action, c) determine a current action measurement for each of multiple characteristics associated with the action, and a current content measurement for each of multiple characteristics associated with the content, where the characteristics are associated with the authentication instruction, d) determine that each of the measurements matches a corresponding benchmark associated with the authentication instruction to within a predefined tolerance, where the benchmarks are selected from the identity authentication profile, and e) perform a)-d) for each of a predefined number of authentication instructions selected from the identity authentication profile, thereby authenticating the individual.

In another aspect of the invention a method is provided for replacing an identity authentication profile, the method including authenticating an individual using a portion of an existing identity authentication pool associated with the individual, where the portion does not include any of an existing identity authentication profile associated with the individual, including any portion of the identity authentication pool in a new identity authentication profile associated with the individual, and configuring a computing device to authenticate the individual by accessing the new identity authentication profile.

In another aspect of the invention a system is provided for replacing an identity authentication profile, the system including an authenticator configured to authenticate an individual using a portion of an identity authentication pool associated with the individual, where the portion does not include any of an existing identity authentication profile associated with the individual, and a configuration manager configured to include any portion of the identity authentication pool in a new identity authentication profile associated with the individual, and configure a computing device to authenticate the individual by accessing the new identity authentication profile.

BRIEF DESCRIPTION OF THE DRAWINGS

Aspects of the invention will be understood and appreciated more fully from the following detailed description taken in conjunction with the appended drawings in which:

FIG. 6 is a simplified block diagram illustration of an exemplary hardware implementation of a computing system, constructed and operative in accordance with an embodiment of the invention.

DETAILED DESCRIPTION

Figure 1A:
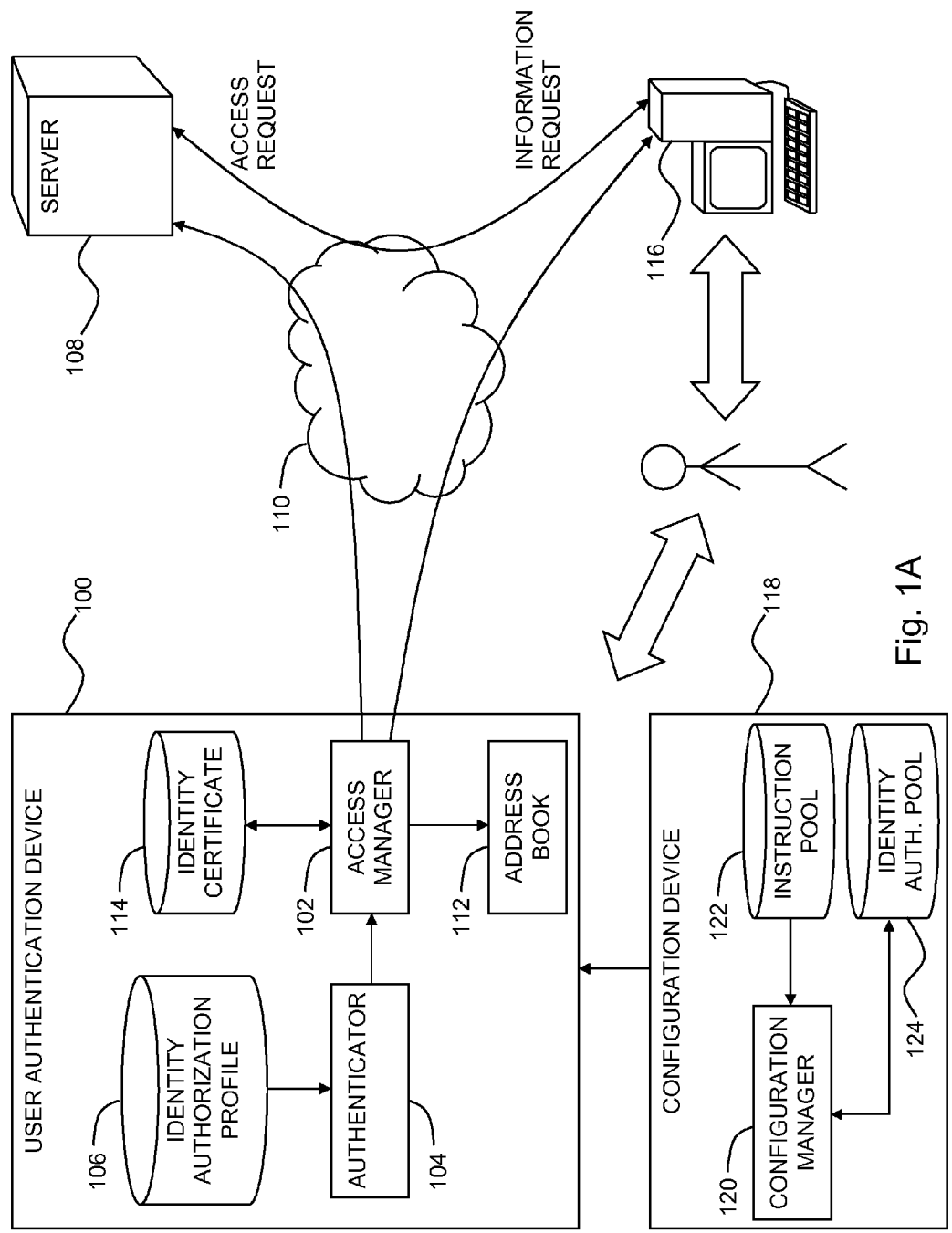
FIG. 1A is a simplified conceptual illustration of a user authentication system constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A which is a simplified conceptual illustration of a user authentication system, constructed and operative in accordance with an embodiment of the invention. In the system of FIG. 1A, a user authentication device 100 is preferably configured with an access manager 102, an authenticator 104, and an identity authentication profile 106. Access manager 102 is preferably configured to facilitate user interaction with systems that are external to user authentication device 100, such as by communicating with a computer server 108 via a communications network 110 such as the Internet, and/or with internal applications that are configured with user authentication device 100, such as by managing user access to an address book 112. Authenticator 104 is preferably configured to authenticate a user of user authentication device 100 by selecting one or more user-associated instructions from identity authentication profile 106, preferably at random, where identity authentication profile 106 has been previously configured such that it is specifically adapted to the user, such as is described in greater detail hereinbelow with reference to FIG. 2. Authenticator 104 provides the selected instructions to the user, preferably in addition to one or more randomly-selected instructions that are not specifically associated with the user, via one or more output interfaces with which user authentication device 100 is configured, such as, for example, via any of a video display, a speaker, or a printer. Authenticator 104 then measures one or more aspects of the user's response to each user-associated instruction, where user authentication device 100 is preferably configured such that the user may respond to each instruction using any of multiple input methods, such as, for example, via mechanical or touch-screen keyboard, handwriting or other tactile input via touch screen, audio input via microphone, and video input via camera. Authenticator 104 then compares the measurements with corresponding benchmark measurements in identity authentication profile 106, and authenticates the user if the measurements, or a minimum number thereof, match their corresponding benchmarks, such as to within a predefined tolerance. A method for using the system of FIG. 1A to authenticate a user is described in greater detail hereinbelow with reference to FIG. 3.

Once user authentication device 100 has authenticated the user, the user may use access manager 102 to select and provide information to any of the aforementioned external or internal systems or applications, such as by selecting and providing any user-related information that is stored in an identity certificate 114 with which user authentication device 100 is likewise configured. Identity certificate 114 may, for example, include personal details of the user, such as, for example, first name, surname, date of birth, citizenship, ID number, social security number, and home address. The selected and provided portions of identity certificate 114 may be encrypted using conventional techniques, and may also be digitally signed using conventional techniques, such as by using public/private key-based techniques, to enable the recipient of the user-related information to authenticate the received identity certificate 114.

Thus, in one exemplary scenario, a user uses a computer 116 to send an access request to server 108, whereupon server 108 responds by requesting user-related information. The user authenticates himself/herself to user authentication device 100 as described above and, if the authentication is successful, selects and provides portions of identity certificate 114 to server 108 via computer 116 using conventional techniques, such as where user authentication device 100 is configured as an input device to computer 116 or is otherwise configured to communicate with server 108 via computer 116. Server 108 checks the authenticity of the received identity certificate 114 and, if authenticated, grants the access request.

The system of FIG. 1A also preferably includes a configuration device 118 having a configuration manager 120, and including or otherwise having access to an instruction pool 122 and an identity authentication pool 124. Configuration manager 120 is preferably configured to create identity authentication profile 106 and identity authentication pool 124 using predefined instructions in instruction pool 122, such as in accordance with the method of FIG. 2 described hereinbelow, and store identity authentication profile 106 onto user authentication device 100. Configuration manager 120 is also preferably configured to create or otherwise obtain identity certificate 114 in accordance with conventional techniques and store identity certificate 114 onto user authentication device 100. Configuration manager 120 is also preferably configured to prevent an attempt by an individual to create multiple identity authentication profiles under different identities in separate configuration sessions, such as may be discovered during a configuration session if responses to instructions are consistent with those for the same instructions that were presented in an earlier configuration session and stored in identity authentication pool 124.

Figure 1B:
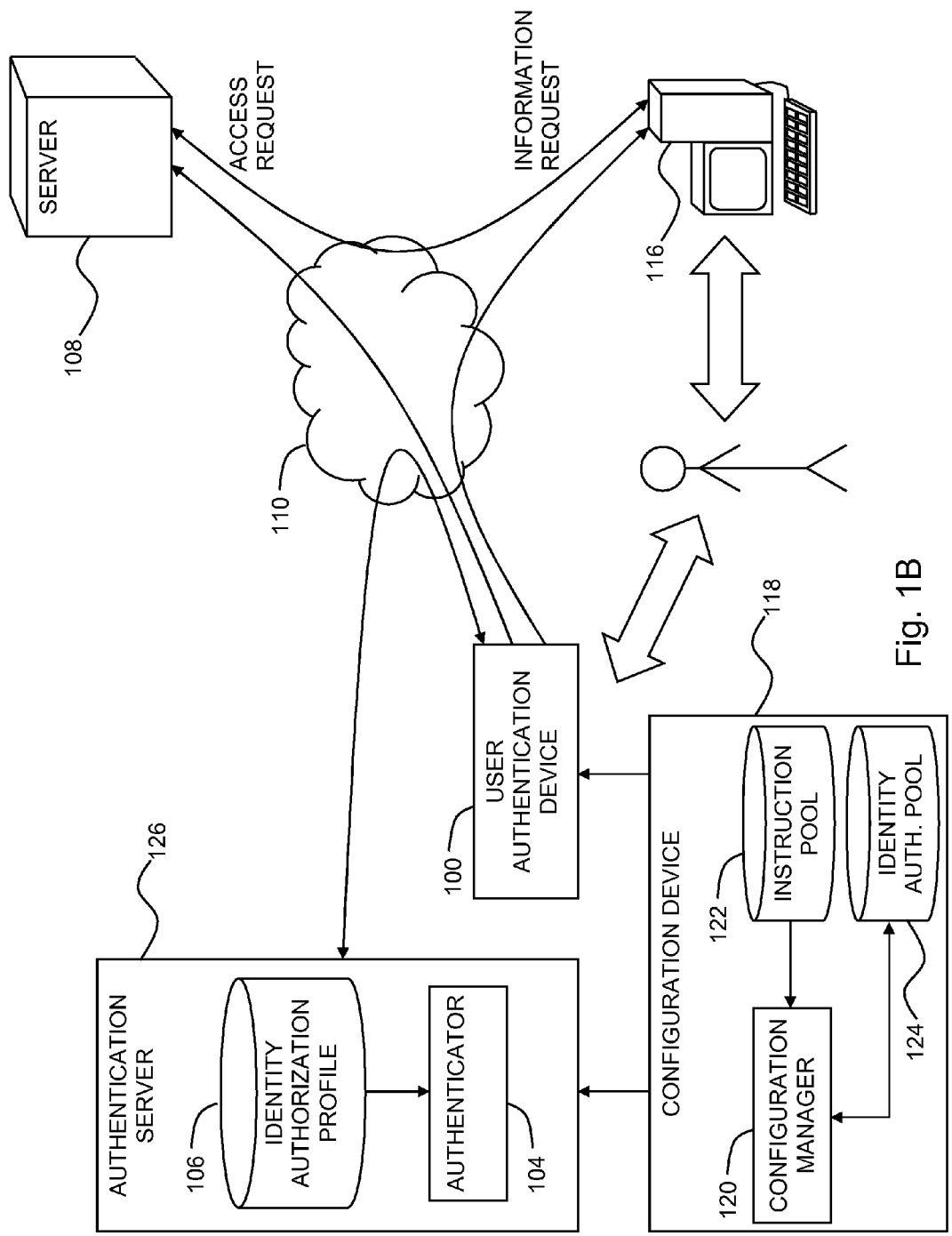
FIG. 1B is a simplified conceptual illustration of a user authentication system constructed and operative in accordance with an alternative embodiment of the invention.

Reference is now made to FIG. 1B, which is a simplified conceptual illustration of a user authentication system, constructed and operative in accordance with an alternative embodiment of the invention. The system of FIG. 1B is substantially similar to the system of FIG. 1A with the notable exception that authenticator 104 and identity authentication profile 106 are not configured with user authentication device 100, but rather are configured with an authentication server 126, in which case user authentication device 100 is configured to communicate with authentication server 126, such as via communications network 110, where authentication device 100 receives authentication instructions from authentication server 126, presents the instructions to an individual, received the individual's responses, and communicates the responses to authentication server 126.

Any of the elements shown in FIGS. 1A and 1B are implemented in computer hardware and/or in computer software embodied in a non-transitory, computer-readable medium in accordance with conventional techniques.

Figure 2:
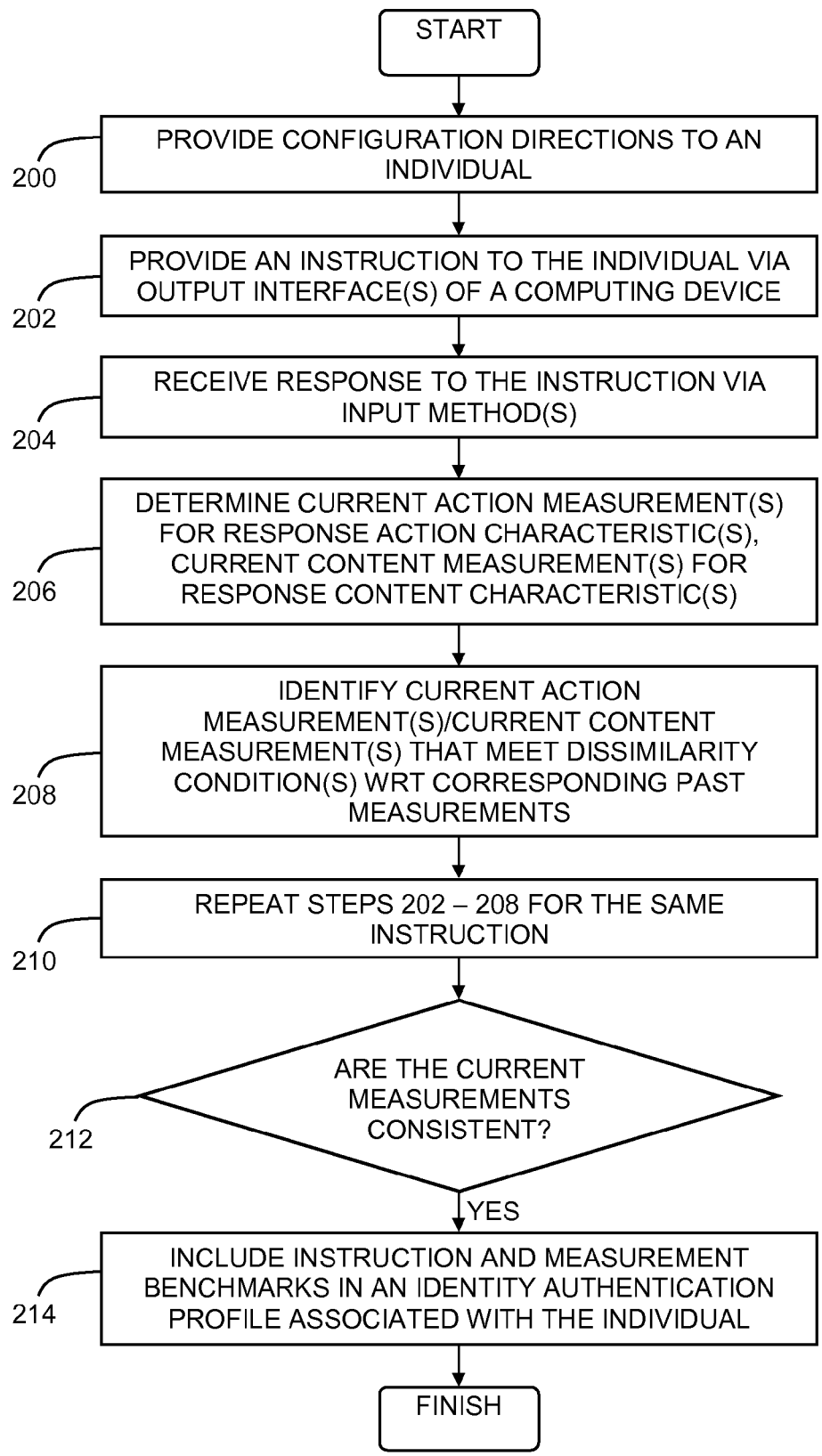
FIG. 2 is a simplified flowchart illustration of a method for configuring a user authentication system, operative in accordance with an embodiment of the invention.

Reference is now made to FIG. 2, which is a simplified flowchart illustration of a method for configuring a user authentication system, operative in accordance with an embodiment of the invention. In the method of FIG. 2, which may be used to configure user authentication device 100 of FIG. 1A and/or authentication server 126 of FIG. 1B, configuration directions are preferably provided to an individual, either orally, in writing, or via one or more output interfaces of a computing device (step 200), such as those output interfaces described hereinabove with reference to FIGS. 1A and 1B, where the computing device is authentication device 100 of FIG. 1A or 1B or any other device having computing capabilities. The configuration directions preferably indicate that the individual will be presented with multiple instructions, where each instruction will be presented multiple times. The configuration directions also preferably indicate that the individual is to interpret each instruction, decide how to react, and then react in a consistent manner each time the same instruction is presented to the individual. An instruction is presented to the individual via one or more output interfaces of the computing device (step 202). The instruction is preferably selected from a predefined pool of instructions that have been previously demonstrated to elicit different interpretations from different individuals regarding the meaning of each instruction, resulting in different decisions how to react to each instruction, where the reactions result in different actions and content from different individuals, and for which various measurements were previously recorded of characteristics of such actions and of the content of the responses to the instructions by different individuals. Examples of such instructions and characteristics are provided in greater detail hereinbelow. A response to the instruction is received via one or more input methods supported by the computing device, such as those input methods described hereinabove with reference to FIGS. 1A and 1B, where the response includes content provided through the performance of an action (step 204).

A current action measurement is determined for each of one or more characteristics associated with the action, as is a current content measurement for each of one or more characteristics associated with the content (step 206). One or more current action measurements, as well as one or more current content measurements, are identified that meets a dissimilarity condition with respect to corresponding past measurements of the same characteristic for responses to the instruction that were previously provided by other individuals (step 208). The dissimilarity condition may, for example, be that a measurement for a characteristic is different than a predefined percentage, such as 90%, of corresponding past measurements of the same characteristic for responses to the instruction that were previously provided by other individuals.

Steps 202-208 are performed a predefined number or minimum number of times, such as three times, by presenting the same instruction to the same individual and receiving multiple responses to the instruction from the individual (step 210). If the different responses, or a predefined number or minimum number thereof, by the individual to multiple presentations of the same instruction are mutually consistent in accordance with a consistency condition, such as where the measurements, or a predefined number or minimum number thereof, for a given characteristic are mutually consistent, such as to within a predefined tolerance, for different responses by the individual to multiple presentations of the same instruction (step 212), then benchmarks of the identified dissimilar measurements, such as averages thereof, are included in an identity authentication profile in association with the instruction, where the identity authentication profile is associated with the individual (step 214).

Preferably, the method of FIG. 2 is performed for a predefined number or minimum number of different instructions with respect to a given individual. A subset of the instructions presented to the individual, together with their associated measurement benchmarks, is then preferably selected for inclusion in an identity authentication profile that is associated with the individual. The identity authentication profile is then preferably stored onto a user authentication device, such as user authentication device 100 of FIG. 1A, and/or onto an authentication server, such as authentication server 126 of FIG. 1B, in accordance with conventional techniques. Any instructions presented to the individual, together with their associated measurement benchmarks, that are not included in the identity authentication profile are preferably maintained for later use, preferably in an identity authentication pool, such as in identity authentication pool 124 of FIGS. 1A and 1B, that is maintained separately from the user authentication device, such as for replacing the individual's identity authentication profile should the user authentication device become lost or stolen. Methods for replacing an identity authentication profile is described in greater detail hereinbelow with reference to FIGS. 4 and 5.

One example of an instruction that may be used when implementing the method of FIG. 2 is the instruction "Draw two hearts." Experimentation with this instruction elicited different interpretations from different individuals, resulting in different actions and different content from different individuals, where the characteristics measured included drawing direction (most respondents drew from left to right), relative heart size (most respondents drew two hearts of generally equal size), relative heart placement (most respondents drew two hearts side by side), and relative heart separation (most respondents drew two hearts with a clear separation between them, whereas one respondent drew two hearts with no separation between them), in addition to characteristics such as drawing speed and pressure, and the temporal relationship between the presentation time of the instruction and the start and finish times of the response.

Another example of an instruction that may be used when implementing the method of FIG. 2 is the instruction of displaying the word "Paralel" on a visual display. This instruction may be expected to elicit different interpretations from different individuals, resulting in different actions and different content from different individuals, where respondents may react by speaking the word "parallel" into a computer-connected microphone, by typing or handwriting the word using the incorrect spelling as presented or using a different spelling, correct or otherwise, by drawing two parallel lines of various lengths, orientations, and separations, or by taking some other action or providing some other type of content, collectively providing many different types of characteristics that may be measured, in addition to other characteristics such as handwriting characteristics, typing speed and cadence, audio characteristics, drawing speed and pressure, and instruction-to-response timing.

Figure 3:
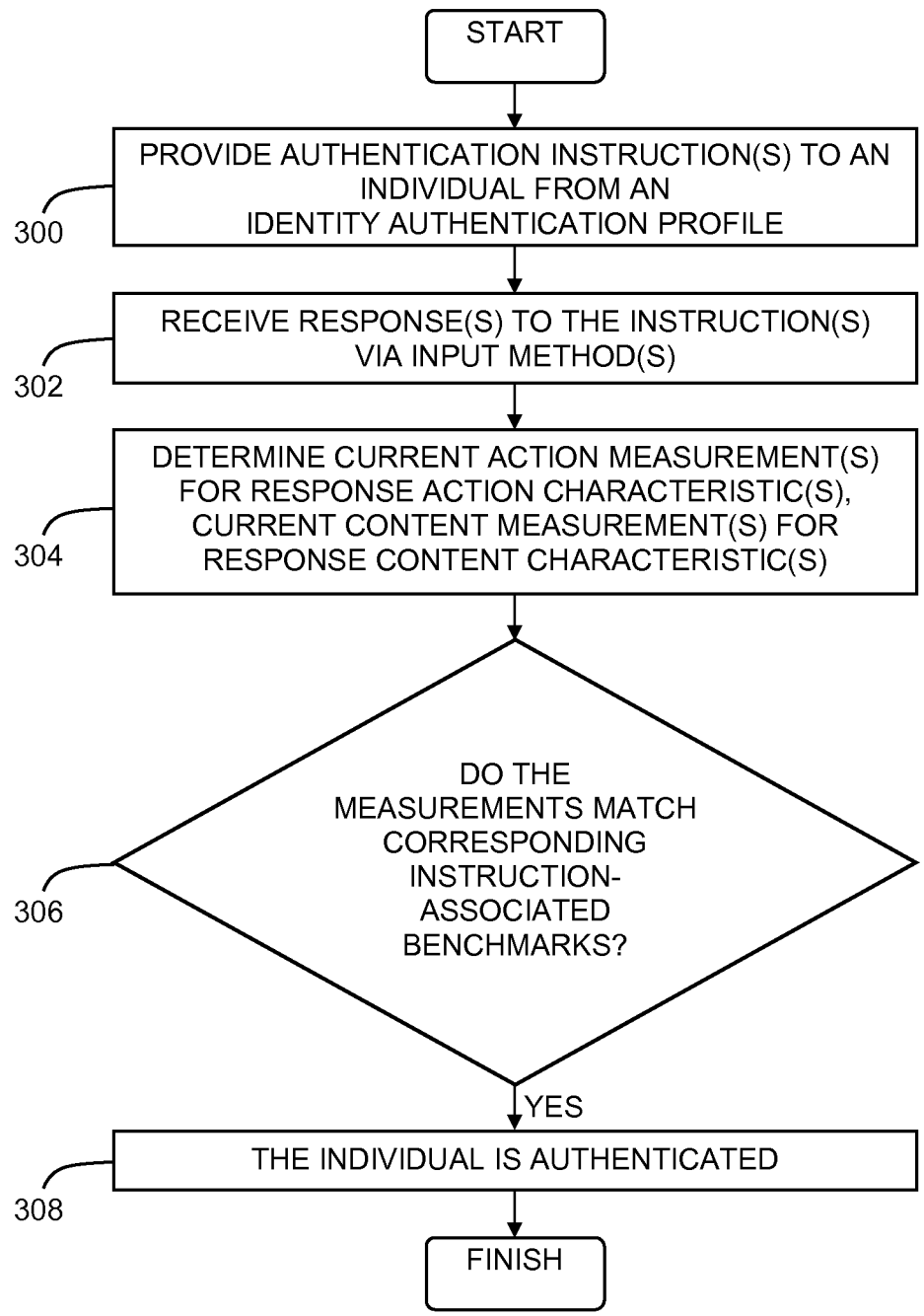
FIG. 3 is a simplified flowchart illustration of a method for authenticating a user, operative in accordance with an embodiment of the invention.

Reference is now made to FIG. 3, which is a simplified flowchart illustration of a method for authenticating a user, operative in accordance with an embodiment of the invention. In the method of FIG. 3, which may be used to authenticate a user using user authentication device 100 of FIGS. 1A and 1B, a predefined number of authentication instructions are presented to an individual via one or more output interfaces of a computing device, such as user authentication device 100 of FIGS. 1A and 1B, where the authentication instructions are selected from an identity authentication profile that is accessible to, and preferably stored on, the computing device (step 300). A response to each instruction is received via one or more input methods supported by the computing device, such as those input methods described hereinabove with reference to FIGS. 1A and 1B, where the response includes content provided through the performance of an action (step 302). For each response to an authentication instruction, a current action measurement is determined for each of one or more characteristics associated with the action, as is a current content measurement for each of one or more characteristics associated with the content, where the characteristics are associated with the authentication instruction (step 304). If, for each of a predefined number or minimum number of the authentication instructions, a predefined number or minimum number of the measurements associated with a response to the authentication instruction matches a corresponding benchmark associated with the authentication instruction to within a predefined tolerance, where the benchmarks are selected from the identity authentication profile (step 306), then the individual is authenticated (step 308).

In one embodiment the method of FIG. 3 includes presenting a predefined number or minimum number of non-authentication instructions to the individual via one or more of the output interfaces of the computing device, preferably interspersed at random among the authentication instructions that are presented to the individual. The non-authentication instructions may or may not be instructions that were previously presented to the individual. The non-authentication instructions are not used for authenticating then individual, such as where measurements of characteristics of the responses to the non-authentication instructions are not determined and/or are not compared to corresponding benchmark measurements, and/or benchmark measurements are not maintained for the non-authentication instructions. As such, the use of non-authentication instructions is intended to make it difficult for the individual, as well as potential thieves impostors, to know what are the instructions on which the individual's authentication depends.

Figure 4:
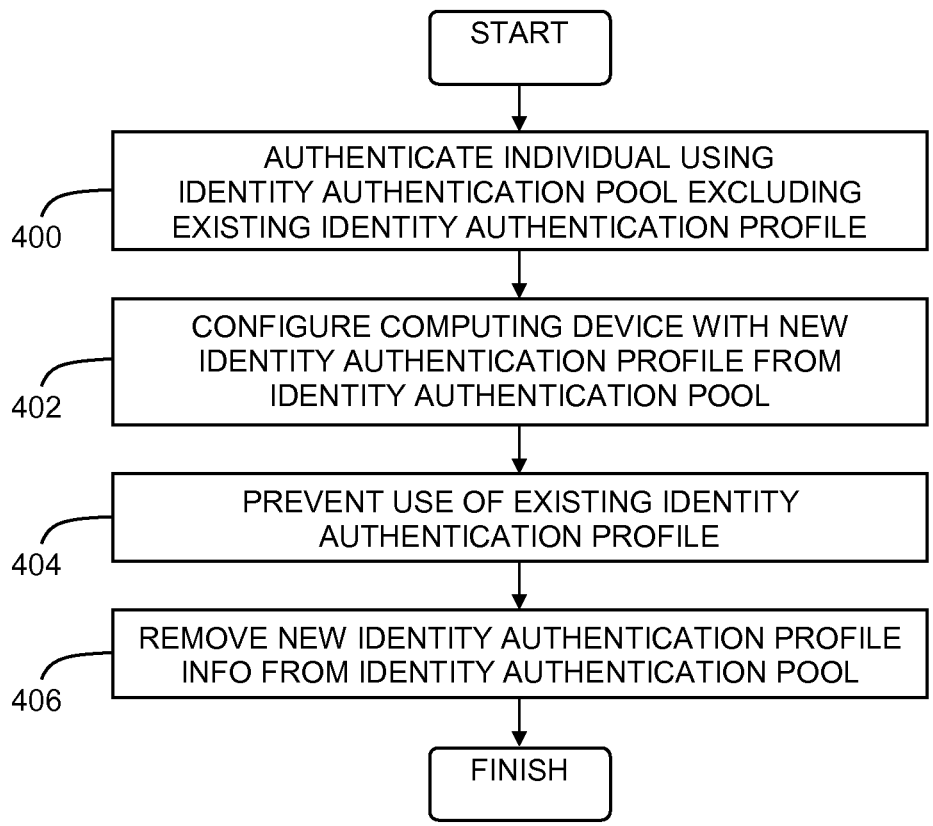
FIG. 4 is a simplified flowchart illustration of a method for replacing an identity authentication profile, operative in accordance with an embodiment of the invention.

Reference is now made to FIG. 4, which is a simplified flowchart illustration of a method for replacing an identity authentication profile, operative in accordance with an embodiment of the invention. In the method of FIG. 4, which may be used to configure user authentication device 100 of FIG. 1A and/or authentication server 126 of FIG. 1B, an individual is authenticated, such as using a copy of authenticator 104 of FIGS. 1A and 1B and using the method of FIG. 3, using a portion of an existing identity authentication pool that is associated with the individual, such as identity authentication pool 124 of FIGS. 1A and 1B, where the identity authentication pool was preferably prepared as described hereinabove with reference to FIG. 2, and where the portion does not include any information that is included in an existing identity authentication profile (now also referred to as the "old" identity authentication profile) that is associated with the individual (step 400). A computing device, such as user authentication device 100 of FIG. 1A and/or authentication server 126 of FIG. 1B, is then configured, such as by configuration manager 120 of FIGS. 1A and 1B, with a new identity authentication profile that likewise includes a portion of the identity authentication pool that does not include any information that is included in an existing identity authentication profile that is associated with the individual (step 402). If possible, any computing device on which the old identity authentication profile is stored is prevented from using or accessing the old identity authentication profile, such as by causing the old identity authentication profile to be deleted from any computing device on which it is stored (step 404). All information that is included in the new identity authentication profile is preferably removed from the identity authentication pool (step 406).

Figure 5:
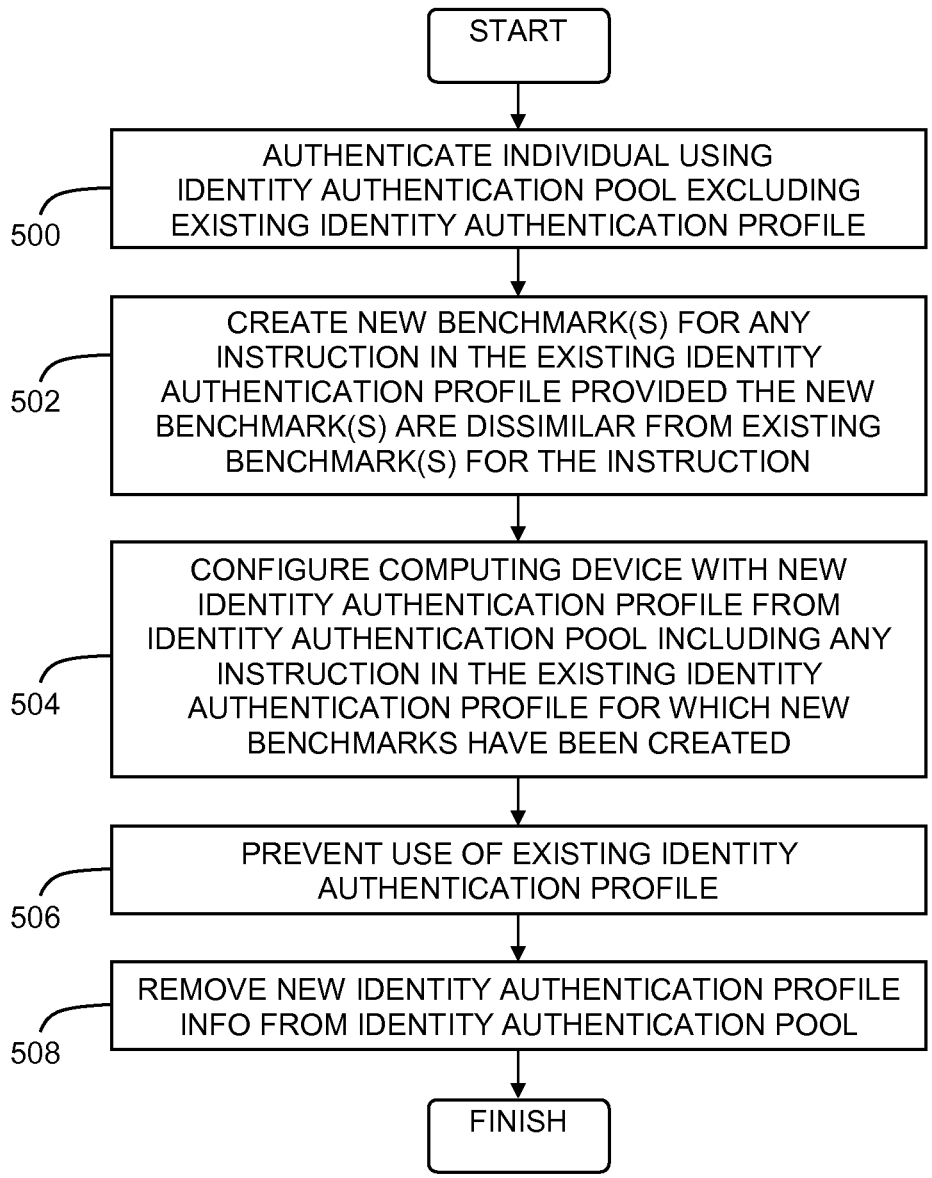
FIG. 5 is a simplified flowchart illustration of a method for replacing an identity authentication profile, operative in accordance with an alternative embodiment of the invention.

Reference is now made to FIG. 5, which is a simplified flowchart illustration of a method for replacing an identity authentication profile, operative in accordance with an alternative embodiment of the invention. The method of FIG. 5 is substantially similar to the method of FIG. 4 with the notable exception that the new identity authentication profile may reuse one or more instructions from the old identity authentication profile, provided that new benchmarks are created for any reused instruction, such as by employing the method of FIG. 2, where the new benchmarks meet a dissimilarity condition with respect to the benchmarks associated with the instruction in the old identity authentication profile.

Referring now to FIG. 6, block diagram 600 illustrates an exemplary hardware implementation of a computing system in accordance with which one or more components/methodologies of the invention (e.g., components/methodologies described in the context of FIGS. 1A-6) may be implemented, according to an embodiment of the invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A user authentication method comprising:
    a) presenting an authentication instruction to an individual via any of a plurality of output interfaces of a computing device, wherein the authentication instruction is selected from an identity authentication profile that is specifically adapted to a user of the computing device and that is accessible to the computing device, and wherein prior to presenting the instruction to the individual the instruction has been previously demonstrated to 1) elicit different interpretations from different individuals regarding the meaning of the instruction, and 2) elicit different decisions how to react to the instruction;
    b) receiving a response to the authentication instruction via any of a plurality of input methods supported by the computing device, wherein the response includes content provided through the performance of an action;
    c) determining
        a current action measurement for each of a plurality of characteristics associated with the action,
        a current content measurement for each of a plurality of characteristics associated with the content, and
        a current measurement of instruction-to-response timing in association with the response to the instruction,
        wherein the characteristics are associated with the authentication instruction, and
        wherein corresponding past measurements of the same characteristics for responses to the instruction that were previously provided by the user of the computing device met a dissimilarity condition with respect to corresponding past measurements of the same characteristics for responses to the instruction that were previously provided by other individuals;
    d) determining that each of the current measurements matches a corresponding benchmark associated with the authentication instruction to within a predefined tolerance, wherein the benchmarks are selected from the identity authentication profile; and
    e) performing steps a)-d) for each of a predefined number of authentication instructions selected from the identity authentication profile, thereby authenticating the individual.

2. The method according to claim 1 and further comprising presenting a predefined number of non-authentication instructions to the individual via any of the output interfaces of the computing device.

3. The method of claim 1 wherein steps a)-e) are implemented in any of
    a) computer hardware, and
    b) computer software embodied in a non-transitory, computer-readable medium.

4. A user authentication system comprising:
    an identity authentication profile; and
    an authenticator configured to
        a) present an authentication instruction to an individual via any of a plurality of output interfaces of a computing device, wherein the authentication instruction is selected from the identity authentication profile that is specifically adapted to a user of the computing device, and wherein prior to presenting the instruction to the individual the instruction has been previously demonstrated to 1) elicit different interpretations from different individuals regarding the meaning of the instruction, and 2) elicit different decisions how to react to the instruction,
        b) receive a response to the authentication instruction via any of a plurality of input methods supported by the computing device, wherein the response includes content provided through the performance of an action,
        c) determine
            a current action measurement for each of a plurality of characteristics associated with the action,
            a current content measurement for each of a plurality of characteristics associated with the content, and
            a current measurement of instruction-to-response timing in association with the response to the instruction,
            wherein the characteristics are associated with the authentication instruction, and
            wherein corresponding past measurements of the same characteristics for responses to the instruction that were previously provided by the user of the computing device met a dissimilarity condition with respect to corresponding past measurements of the same characteristics for responses to the instruction that were previously provided by other individuals,
        d) determine that each of the current measurements matches a corresponding benchmark associated with the authentication instruction to within a predefined tolerance, wherein the benchmarks are selected from the identity authentication profile, and
        e) perform a)-d) for each of a predefined number of authentication instructions selected from the identity authentication profile, thereby authenticating the individual,
    wherein the identity authentication profile and the authenticator are implemented in any of
        a) computer hardware, and
        b) computer software embodied in a non-transitory, computer-readable medium.

5. The system according to claim 4 wherein the authenticator is configured to present a predefined number of non-authentication instructions to the individual via any of the output interfaces of the computing device.

6. A method for configuring an identity authentication profile, the method comprising:
    a) presenting an instruction to an individual via any of a plurality of output interfaces of a computing device, wherein prior to presenting the instruction to the individual the instruction has been previously demonstrated to 1) elicit different interpretations from different individuals regarding the meaning of the instruction, and 2) elicit different decisions how to react to the instruction;

b) receiving a response to the instruction via any of a plurality of input methods supported by the computing device, wherein the response includes content provided through the performance of an action;

c) determining a current action measurement for each of a plurality of characteristics associated with the action;

d) determining a current content measurement for each of a plurality of characteristics associated with the content;

e) identifying
   at least one of the current action measurements that meets a dissimilarity condition with respect to corresponding past measurements of the same characteristic for previously-received responses to the instruction, and
   at least one of the current content measurements that meets a dissimilarity condition with respect to corresponding past measurements of the same characteristic for previously-received responses to the instruction,
   wherein the previously-received responses were provided by a plurality of other individuals;

f) performing steps a)-e) a plurality of times, thereby receiving a plurality of responses;

g) determining that the plurality of responses are mutually consistent in accordance with a consistency condition; and h) determining, in association with any of the responses to any of the instructions, measurements of instruction-to-response timing, and including benchmarks of the measurements in an identity authentication profile in association with the instruction, wherein the identity authentication profile is associated with the individual.

7. The method according to claim 6 and further comprising performing steps a)-h) for a plurality of instructions.

8. The method according to claim 6 and further comprising providing configuration directions to the individual, wherein the configuration directions indicate that the individual will be presented with multiple instructions, that each of the multiple instructions will be presented multiple times, and that the individual is to interpret each instruction, decide how to react, and then react in a consistent manner each time the same instruction is presented to the individual.

9. The method according to claim 6 and further comprising storing the identity authentication profile onto either of a user authentication device and an authentication server.

10. The method according to claim 9 and further comprising:
performing steps a)-g) for a plurality of instructions for which benchmarks of the identified measurements are included in an identity authentication pool in association with the instructions; and
maintaining the identity authentication pool separately from the user authentication device.

11. The method according to claim 6 and further comprising:
determining, in association with any of the responses to any of the instructions, measurements of any of handwriting characteristics, drawing speed, drawing pressure, typing speed, typing cadence, and audio characteristics; and
storing any of the measurements in the identity authentication profile in association with the instruction.

12. The method according to claim 6 and further comprising determining that the plurality of responses are inconsistent with responses to the instruction received in a previous configuration session.

13. The method according to claim 6 wherein steps a)-h) are implemented in any of
   a) computer hardware, and
   b) computer software embodied in a non-transitory, computer-readable medium.

14. The method according to claim 1 and further comprising:
receiving from the authenticated individual a selection selecting, from within an identity certificate stored on the computing device, information associated with the authenticated individual, wherein the selected information is encrypted and digitally signed using a public/private key-based technique, thereby enabling a recipient of the selected information to authenticate the received information; and
providing the selected information to the recipient in association with an access request.

15. The system according to claim 4 wherein the authenticator is configured to:
receive from the authenticated individual a selection selecting, from within an identity certificate stored on the computing device, information associated with the authenticated individual, wherein the selected information is encrypted and digitally signed using a public/private key-based technique, thereby enabling a recipient of the selected information to authenticate the received information, and
provide the selected information to the recipient in association with an access request.

* * * * *